INVENTOR
WALTER J. DENKOWSKI
BY Paul + Paul
ATTORNEYS.

July 7, 1970     W. J. DENKOWSKI     3,518,891

FAIL-SAFE VALVE OPERATOR

Filed Oct. 26, 1966     5 Sheets-Sheet 2

INVENTOR

WALTER J. DENKOWSKI

BY Paul + Paul

ATTORNEYS.

July 7, 1970     W. J. DENKOWSKI     3,518,891

FAIL-SAFE VALVE OPERATOR

Filed Oct. 26, 1966     5 Sheets-Sheet 3

INVENTOR

WALTER J. DENKOWSKI

BY Paul & Paul

ATTORNEYS.

July 7, 1970 W. J. DENKOWSKI 3,518,891
FAIL-SAFE VALVE OPERATOR
Filed Oct. 26, 1966 5 Sheets-Sheet 4

INVENTOR
WALTER J. DENKOWSKI
BY
Paul & Paul
ATTORNEYS.

United States Patent Office 3,518,891
Patented July 7, 1970

3,518,891
FAIL-SAFE VALVE OPERATOR
Walter J. Denkowski, King of Prussia, Pa., assignor to King of Prussia Research and Development Corporation, King of Prussia, Pa., a corporation of Pennsylvania
Filed Oct. 26, 1966, Ser. No. 589,610
Int. Cl. F16k *31/05, 31/10*
U.S. Cl. 74—89.15                                       22 Claims

---

ABSTRACT OF THE DISCLOSURE

A fail safe valve operator is disclosed in which a valve stem is driven longitudinally by a rotatable nut. The nut is connected to a thrust sleeve which is preloaded in a fail-safe direction by a heavy coil spring. Secured to the thrust sleeve is a carriage having ball detents therein which project into a recess in the housing. A releasable retaining sleeve is provided for retaining the ball detents in the housing recess for preventing the release of the energy stored in the coil spring while nevertheless allowing the nut to be power driven rotationally to cause longitudinal movement of the valve stem. Latch means triggered by power failure release the ball-detent retaining sleeve to allow the energy stored in the spring-loaded thrust sleeve to discharge the ball detents from the housing recess, whereby the valve stem is quickly pulled to a fail-safe position by the spring-loaded thrust sleeve.

---

This invention relates to valve operators.

A broad purpose of the present invention is to provide a fail-safe valve operator which upon power failure will move the valve to a position which will cause least damage to the system. The fail-safe position may be either the closed or the open position of the valve. The present invention is especially useful in sub-sea and subterranean installations.

Basically, in accordance with the present invention, as the valve operator is power moved in a direction to move the valve stem away from the fail-safe position, energy is built up in a fail-safe spring. Upon failure of the power, the energy stored up in the fail-safe spring is released to return the valve stem to its initial or starting fail-safe position.

A more specific purpose of the present invention is to provide, for a valve operator, means which will assuredly latch the fail-safe spring against release so long as the power is on, and which upon power failure will instantly release the latching mechanism to allow the spring energy to be released.

A still more specific purpose is to provide a fail-safe mechanism as above which requires a minimum of power to perform the latch-releasing function.

The mechanism provided by the present invention includes a plurality of steel balls which are employed to lock the fail-safe spring against release. The steel locking balls are themselves locked into locking position by ball release means controlled by a solenoid-controlled latch. Upon failure of power, the latch is released. This releases the ball release means and allows the locking balls to move from locking to release position, thereby releasing the fail-safe spring. The design of the mechanism is such that the solenoid which holds the latch in latching position need only overcome the dead weight of its related parts and the leverage force of an off-center biasing spring.

While the use of steel balls is preferred to lock the fail-safe spring, spherical rollers could also be used. In the specification which follows, and in the claims, the term "locking balls" will, for convenience, be used, but it is to be understood that the term "balls" includes spherical rollers.

In the description which follows it will also be convenient to assume that the valve operator is powered by electrical power, but it is to be understood that modifications to certain of the components will allow the utilization of other forms of prime movers than electric motors and other forms of power without departing from the invention described and claimed.

In a practical installation, provision will also be made to operate the valve manually through the medium of a nut attached to the external motor-shaft projection and protected by a removable cap. The provision of manual operating means is useful during installation of the equipment. This particular feature is, however, unrelated to the invention being claimed herein.

The valve operator shown and described herein will also be so designed that upon restoration of power after power failure, a predetermined cycling sequence may be initiated from a remote location to restore the components to the normal pattern of operation which they occupied prior to the power failure. Suitable controlling and indicating devices will also be provided to effect the above provision and to annunciate the state of operation and/or position of the valve. The present invention is, however, not directly concerned with these features.

The purposes and advantages of the present invention will be clearly understood from a reading and consideration of the following detailed description taken together with the drawings wherein:

FIG. 2 is a view, in section, taken along the line II—II of FIG. 1 showing, among other things, the valve stem, the nut, the drive sleeve, the fail-safe spring, the thrust sleeve, the locking ball carriage, the ball release, etc. In FIGS. 1 and 2, the stem is shown in the DOWN position, and the fail-safe spring is shown in compressed locked position ready upon release to return the valve stem and valve to the UP or fail-safe position;

In FIG. 6, the trigger latch is shown in latched position;

In describing the valve operator shown in the drawings, it will be convenient to refer to certain portions of certain parts as the upper or lower portion, or the upper or lower end, etc., and to refer to the stem, or nut or other part, as moving up or moving down. However, it is to be understood that the valve operator need not be disposed in the vertical position shown in the drawings. For example, it may be disposed in a horizontal or other position.

Figure 2:
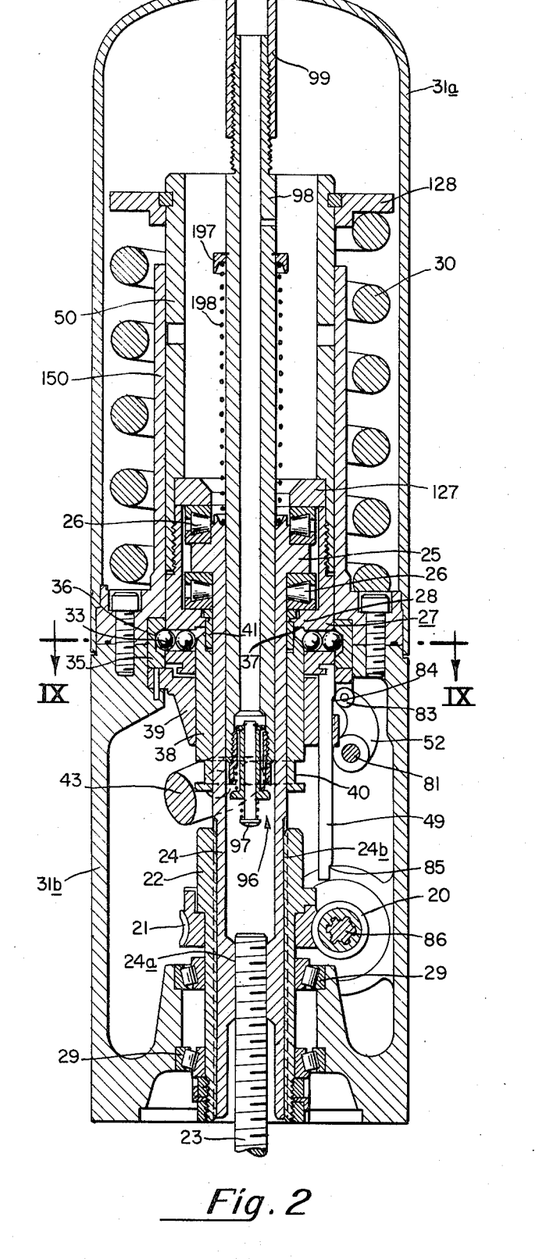
Figures 3, 12, 13:
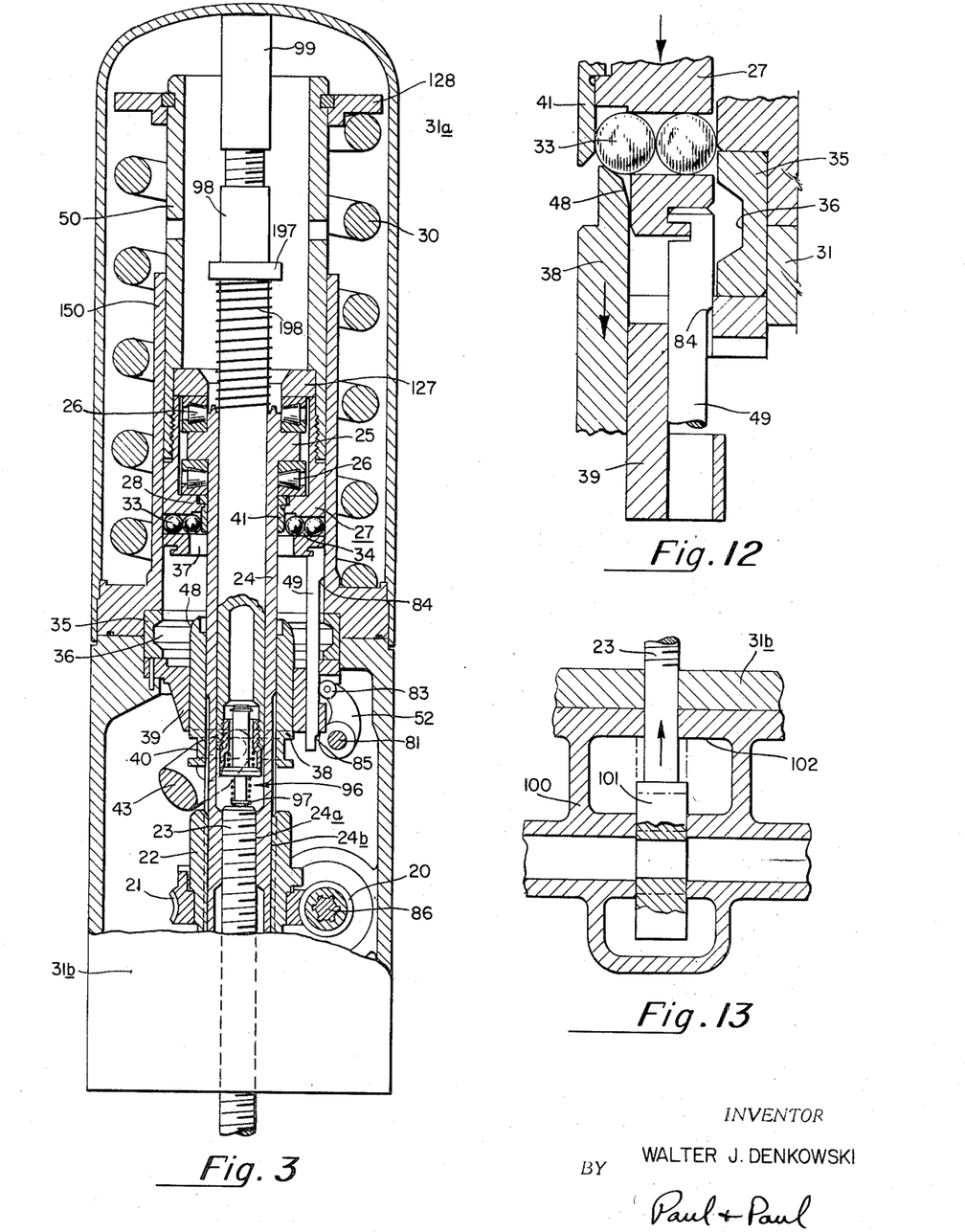
FIG. 3 is a view, in section, generally similar to that of FIG. 2 but showing the stem and fail-safe spring in the UP or fail-safe position, i.e., in the positions which they assume after power failure.
FIG. 12 is generally similar to FIG. 11 but shows the thrust sleeve and ball carriage being returned downward after resumption of power following power failure.
FIG. 13 is a diagrammatic illustration of one form of valve showing the closure element controlled by vertical movement of the valve stem.

Referring now to the drawings, an externally threaded valve stem 23 having at its lower end a valve plug or other closure element, such as closure element 101 of FIG. 13, is threaded, as seen in FIGS. 2 and 3, to the internally-threaded portion 24a of an elongated nut 24 which is keyed as by splines 24b to an internally-splined drive sleeve 22. Drive sleeve 22 is rotatively supported in bearings 29 (FIG. 2) in the lower part 31b of the stem housing to provide the stem nut 24 with suitable alignment and to convey rotary motion from the drive worm gear 21 and drive worm 20 to the nut 24. The splined coupling between the nut 24 and drive sleeve 22 allows free sliding motion axially of the nut 24 in the drive sleeve 22.

The upper end of nut 24 is provided with a flange or ring 25 which is contained by bearings 26, which in turn are supported in and contained by a ring 127 and the shoulders 28 of a ball carriage 27. Ball carriage 27 is secured to a thrust sleeve 50 which extends upwardly and has at its upper end a thrust flange 128 which contains the upper end of the fail-safe spring 30. The function of the thrust sleeve 50 is to transmit axial force from the fail-safe spring 30 to the nut 24 while allowing the nut to be rotated by the splines of the drive sleeve 22. Thrust sleeve 50 is movable axially within a fixed sleeve 150 which is flanged at its lower end and bolted to the upper end of the lower housing 31b.

Figures 1, 9:
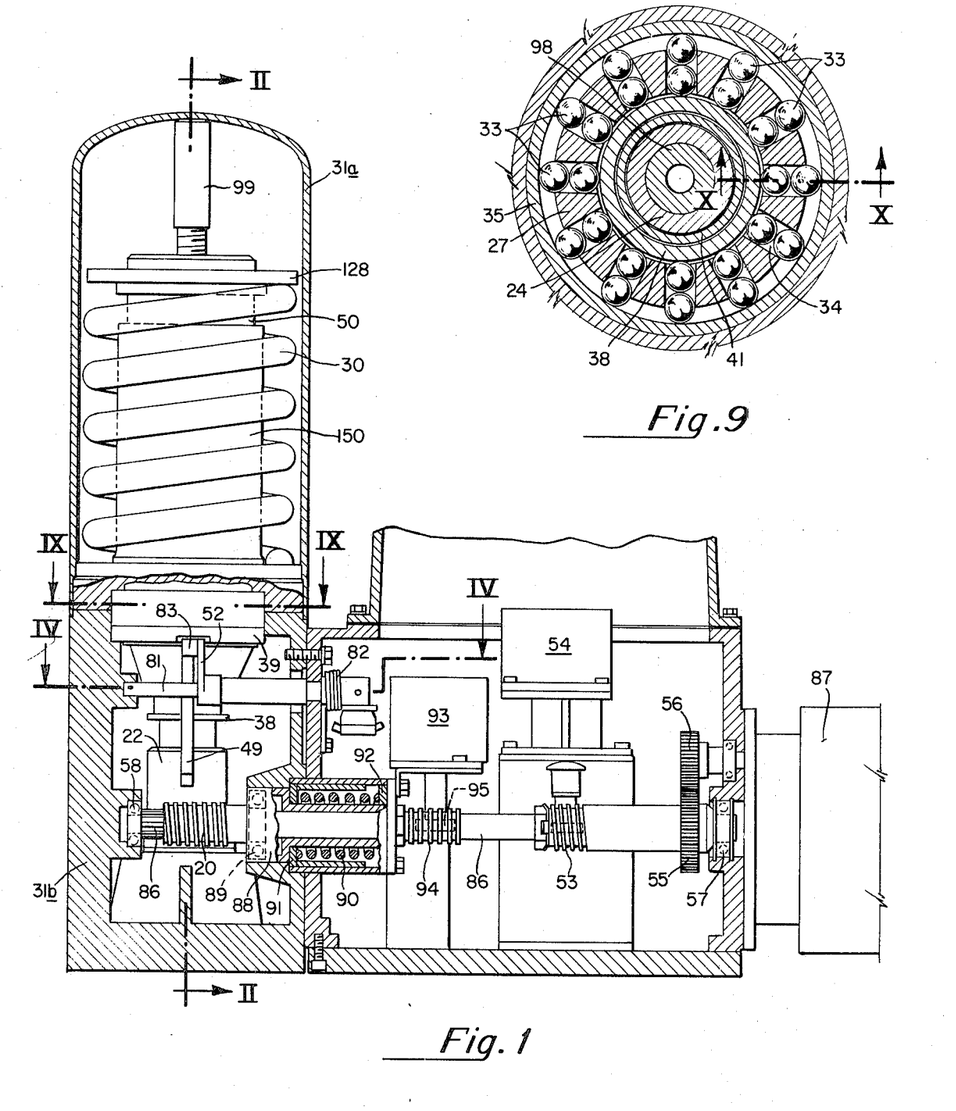
FIG. 1 is a side elevational view, partly in section, of the valve operator and control means.
FIG. 9 is a view, in section, looking along the line IX—IX of FIG. 1 showing the locking-ball carriage, the locking balls, and the annular fixed locking groove.

The thrust sleeve 50 and ball carriage 27 are urged upwardly, away from the drive sleeve 22, by the energy stored in the fail-safe spring 30. The reaction to this spring force is supplied by the lower stem housing 31b. The force of the spring 30 is arrested, when the thrust sleeve 50 is in the loaded position, by the action of a multiplicity of locking balls 33 which, as seen most clearly in FIG. 9, are positioned in radially directed cylindrical holes 34 in the ball carriage 27. A stationary annular member 35 is fixed mounted in the housing and its inward surface is provided with a circumferential groove 36 with sloping sides, as best seen in FIGS. 10-12, to receive projecting parts of balls 33 when the radial holes 34 in the ball carriage 27 are in axial alignment with the groove 36.

The lower end of ball carriage 27 is counterbored at 37 to accept an annular ball release 38 which surrounds nut 24 and is centered in and guided by a ball release cartridge 39. Depending downward into counterbore 37 is a ball retaining sleeve 41 which is secured to the ball carriage 27. The sole function of retaining sleeve 41 is to prevent the locking balls 33 from dropping out of the ball carriage 27 when the ball release 38 is withdrawn from the counterbore 37, as is the case when the holding device is in the released condition.

Figure 10:
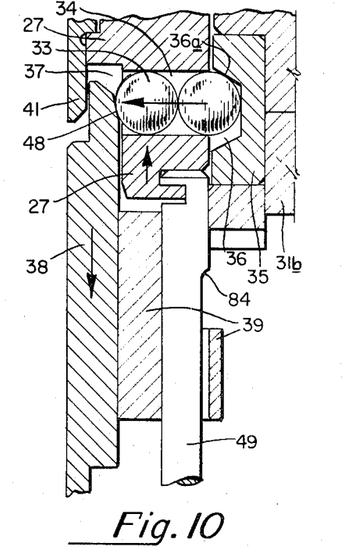
FIG. 10 is an enlarged detailed view looking along the line X—X of FIG. 9 showing the ball release holding the locking balls in locked position.
Figure 11:
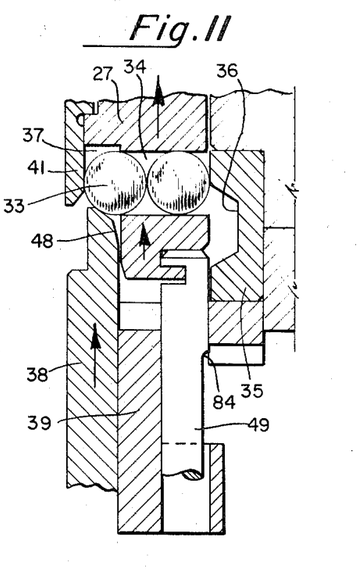
FIG. 11 is a view generally similar to that of FIG. 10 but showing the ball release withdrawn and the locking balls in released position, with the ball carriage and thrust sleeve about to move upward as the energy in the fail-safe spring is released.

The upper end of ball release 38 has an enlarged inner diameter, as best seen in FIGS. 10-12, to allow entrance of the release 38 into the counterbore 37 of the ball carriage 27, and its outer surface has a pair of slopes to forcibly dislodge locking balls 33 radially outward toward the fixed groove 36 and to cause a portion of a ball, in each radial hole 34, to enter the groove 34 when the radial holes 34 and the fixed groove 36 are in axial alignment.

In the preferred embodiment, as described and illustrated herein, each of the radial holes 34 contains two locking balls 33, but the mechanism could be constructed to operate with more, or less, than two balls per hole.

The lower end of the ball release 38, i.e., the end of the ball release opposite to the ball carriage 27, is provided with an annular groove 40, as best seen in FIGS. 2 and 3. Two diametrically-opposed internally-directed trunnion pins 42, best seen in FIG. 4, engage this groove, the opposite ends of pins 42 being situated rotatably in the divergent ends of a bifurcated fork 43 which is pivotally mounted on and rotatively attached to a shaft 44 which extends through a wall of the lower stem housing 31b into the control housing 45 wherein provision is made, as by latch 75, to restrain or release this shaft 44 for rotation, as will be described in detail hereinafter.

Figure 4:
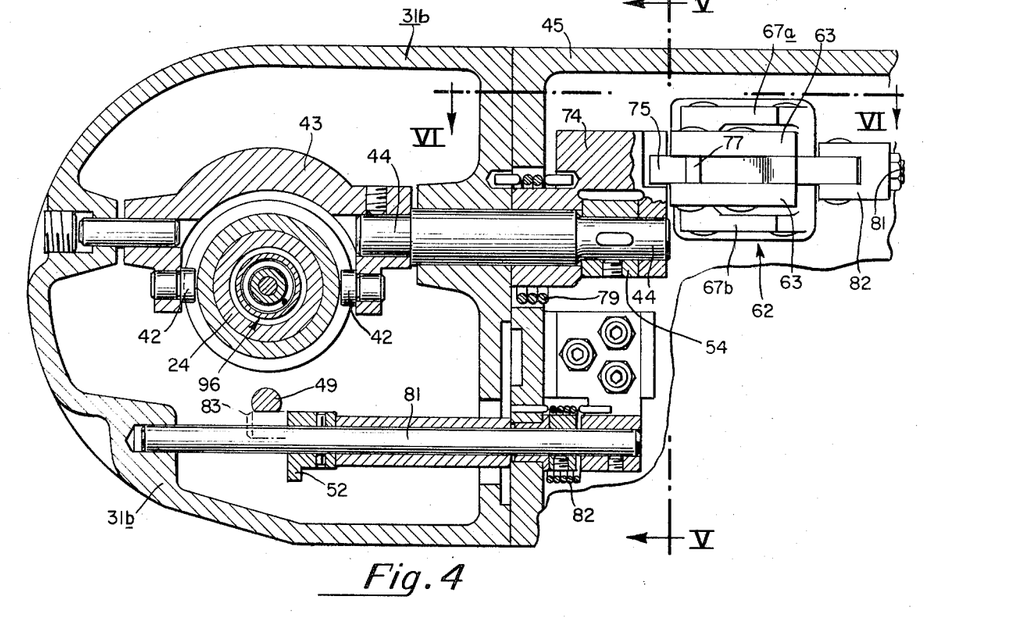
FIG. 4 is a view, in section, looking down along the line IV—IV of FIG. 1 showing, among other things, the fork which operates the ball release, the latching means for the fork, and the position-indicating shaft.

As shown in FIGS. 2, 3 and 4, the ball release cartridge 39 provides also guiding means for a fail-safe indicating rod 49 which depends therefrom and whose surface has formed thereon camming means, as at 84 and 85. A lever 52 fixed to a shaft 81 and equipped with a follower 83 engages the cam surface of rod 49 and derives motion according to the position of the fail-safe components to actuate, through adjustable actuators 110 (FIG. 5), a pair of annunciation switches 112 located within the control housing 45. Suitable spring return force is provided by spring 82 (FIG. 4), and suitable adjustability is provided by the actuators 110, to insure consistent repeatability.

As seen in FIGS. 1-3, the worm 20 which engages the worm gear 21 is of hollow design, internally splined to be slidably engaged to the worm shaft 86. As shown in FIG. 1, a spiral gear 53 is fixed on worm shaft 86 for the purpose of driving a revolutions-counting geared limit switch 54. A worm shaft drive gear 55 is also rotatively fixed thereon to transmit rotational power from the motor 87 via the motor pinion 56. The worm shaft 86 is axially restrained by a radial ball bearing 57 seated in the motor end of the control housing 45. This bearing 57, in conjunction with another bearing 58 in the lower stem housing 31b at the opposite end of the worm shaft 86, provides the shaft 86 with rotational stability and allows the shaft to transmit power from the motor 87 to the worm 20.

The worm 20 also is axially restrained relative to a slidably mounted bearing cartridge 88 which contains a radial bearing 89 concentric with both shaft 86 and worm 20 and which allows the worm 20 unrestrained rotary motion. The cartridge 88 is axially resiliently held in a neutral position by the combined action of a torque spring 90, two thrust washers 91 and 92, and associated shoulders, counterbores, and retaining caps, such that excessive torque resistance encountered by the worm gear 21 is registered in the worm 20 by axial displacement on shaft 86 as the worm 20 actually climbs on the gear teeth 21. This linear motion, transferred by the bearing 89 to the cartridge 88 is transmitted of the torque switch 93 through the circular rack 94 of the bearing cartridge 88 in mesh with the torque switch pinion 95.

Although not shown in the drawings, the outer motor shaft extension may preferably be fitted with a square nut so that the unit can be operated manually with a wrench. This nut may be protected by a removable cap which is screwed in place. The same wrench may be used to remove the cap and to operate the unit. The cap may be equipped with a pressure-relief valve. In a submerged application, for emergency operation, a diver would take a spare cap which would have been previously packed with water-pump grease and replace the original cap with the spare when the manual operation is completed. During underwater installation of the cap, the grease would expel the water surrounding the shaft and nut, the relief valve preventing a hydraulic lock when the O-ring starts to seat. The original cap would be retrieved and stored ashore for subsequent similar use.

Figure 6:
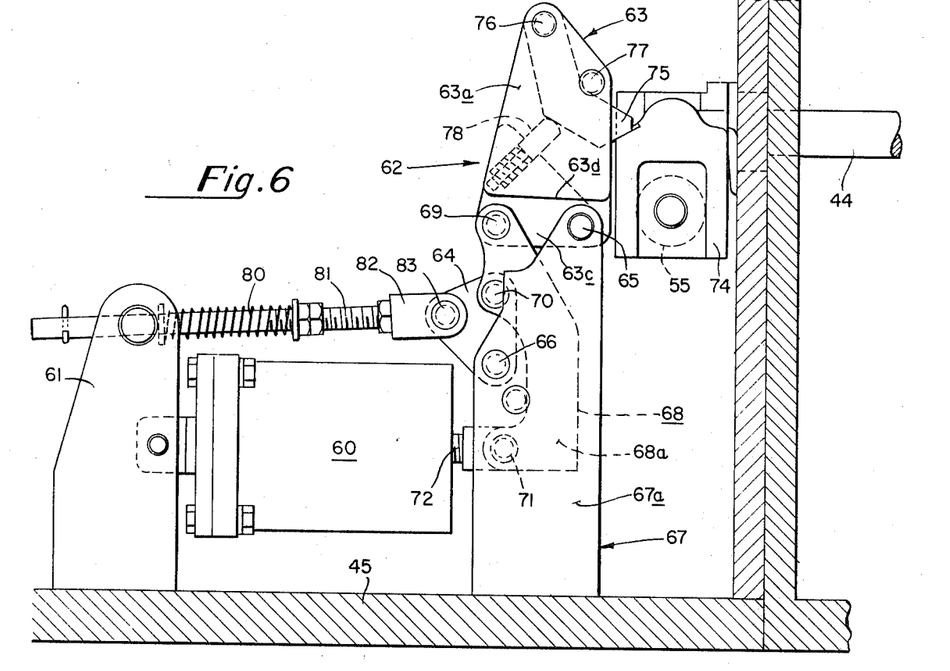
FIG. 6 is a view taken along the line VI—VI of FIG. 5 showing the solenoid, the trigger latch and the trigger release mechanism.

Returning again to FIG. 4, as previously indicated, angular rotative movement of fork shaft 44 is permitted or prevented by latch 75. The details of latch 75 and its trigger mechanism are shown in FIGS. 6–8 and will now be described:

A solenoid 60 is mounted between the legs of a bifurcated bracket 61 fixed mounted in the control housing 45. The function of solenoid 60 is to effect a holding force on a toggle-type triggering mechanism indicated comprehensively by the reference numeral 62. The design of this mechanism is such that a relatively small amount of solenoid force is required to maintain the trigger latch in a position to prevent the firing of the fail-safe mechanism. FIG. 6 shows the toggle-type triggering mechanism 62 in the position which it occupies when the power is on and the solenoid is energized. FIG. 7 shows the triggering mechanism 62 in the position which it takes when the power fails and the solenoid is deenergized.

A bifurcated trigger bracket 63, having a narrow solid base portion 63c and a wider two-pronged upper portion comprised of members 63a and 63b forming shoulders at 63d, is pivotally mounted on stationary pin 65 fixed between the spaced-apart plates 67a and 67b of a stationary toggle bracket 67. A triangular plate 64, which functions as a pivot lock, is pivotally mounted on stationary pin 66 fixed mounted between the plates 67a and 67b of stationary toggle bracket 67. When the triggering mechanism moves, the respective motions of the trigger bracket 63 and the pivot lock 64 are rotary about their respective mounting pins 65 and 66 but their respective rates of rotation and limits of rotation are controlled by the position of a toggle lever 68 which is generally U-shaped in horizontal cross section and generally L-shaped in vertical cross section, the two sides being identified as 68a and 68b. The toggle lever 68 is pivotally pinned to the solid base portion 63c of trigger bracket 63 by pin 69 and to the pivot lock 64 by pin 70. The opposite end of the toggle lever 68 is pivotally attached by pin 71 to the plunger 72 of solenoid 60. It will be observed that toggle lever 68 is not mounted on any fixed pivot pin.

Figures 7, 8:
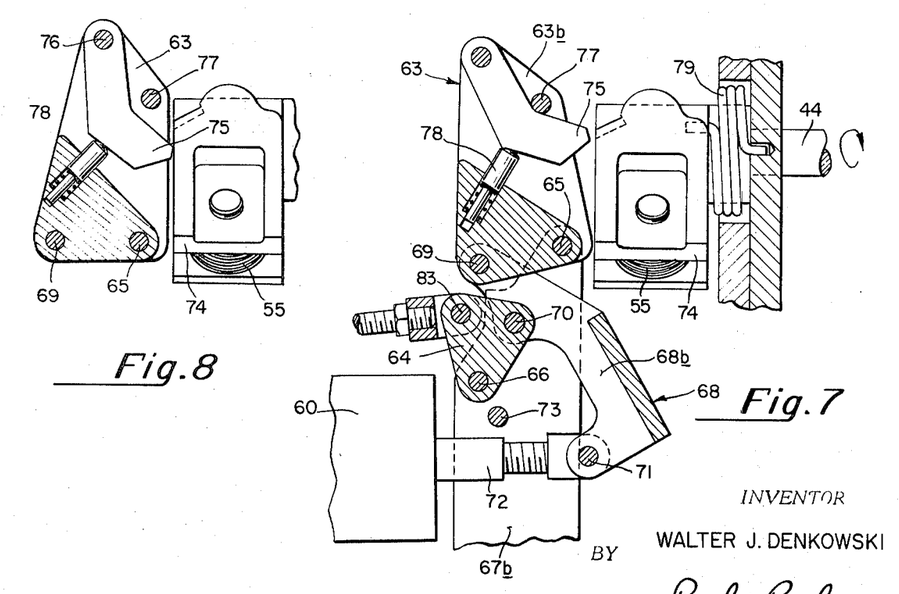
FIG. 7 is a view of a portion of FIG. 6 showing the trigger mechanism in the position which it assumes after power failure. The trigger latch is shown in unlatched position.
FIG. 8 is a view showing the latch trying to return to latch position after resumption of power, following power failure.

FIG. 7 illustrates the position of the component parts when the solenoid 60 is in deenergized condition. When solenoid 60 becomes energized, its plunger 72 is withdrawn, pulling the lower end of the toggle lever 68 with it. This causes the toggle lever 68 to swing clockwise from the position shown in FIG. 7 to the position shown in FIG. 6, which simultaneously effects counterclockwise pivoting of the pivot lock 64 about fixed pin 66 and clockwise pivoting of trigger bracket 63 about fixed pin 65 until the motion of the toggle lever 68 is arrested by the stationary stop-pin 73 located in the toggle bracket 67. By this time, the secondary movable pivot pins 69 and 70 associated with the toggle lever 68 are in direct vertical line with the fixed pivot lock pivot pin 66, as illustrated in FIG. 6, and in this position no leverage can be transmitted back from the pivotable trigger bracket 63 to dislodge their positions.

Returning now to FIGS. 1, 2 and 3, the compressed main fail-safe spring 30 provides the force to move the stem 23 upward to the UP limit position, the UP limit position being the fail-safe position. A portion of this upward main fail-safe spring force is applied, by way of thrust sleeve 50 and by means of ball carriers 27, to the undersurface of the balls 33, as indicated in FIG. 10, and by reason of the sloping contour of the upper wall 36a of fixed holding groove 36, a resultant force component acts to urge the balls 33 radially inward. A portion of this force component acts to urge the ball release 38 downward due to the creation of a downward force component resulting from the inclined surface 48 (see FIG. 10) at the upper end of the ball release 38. This downward ball-release dislodging force is transferred from the ball release 38 via the fork 43 (FIG. 4) and trunnion pins 42 to the fork shaft 44 urging the shaft 44 to move in a counterclockwise direction as viewed looking in from the right in FIG. 4, and as viewed in FIG. 5. This force is transferred from the fork shaft 44 to the fork lever 54 and via the Belleville spring set 55 to the spring lever 74 (FIGS. 5, 6 and 7) at which point the force tending to rotate the fork shaft 44 (clockwise as viewed in FIGS. 6 and 7 looking in from the right) is arrested by the trigger latch 75, as illustrated in FIG. 6. The trigger latch 75 is pivotally mounted on pin 76 between the spaced-apart arms 63a and 63b of the trigger bracket 63. The end of the trigger latch 75 in contact with the spring lever 74 is bevelled to assist in the direction of latching.

The trigger latch 75 normally rests against a stop pin 77 positioned in the trigger bracket 63 and is held in this position through the combined action of a spring-loaded push pin 78 mounted in the base portion 63c of the bracket 63 and projecting therefrom between the plates 63a and 63b, and the force components derived from the spring lever 74. These force components combine to induce the torsional force on the trigger bracket 63 that the toggle mechanism 62 must withstand when it is in the in-line position illustrated in FIG. 6. To upset this balanced condition, spring 80, pushrod 81, clevis 82 and trunnion 83 are employed to force the pivot lock 64 off the dead-center position when the solenoid 60 becomes deenergized. This allows the trigger bracket assembly to yield to the torsional force imposed on it and it becomes a "falling block," allowing the spring lever 74 to rotate the trigger bracket assembly out of the holding position. The solenoid 60, therefore, has only to overcome the dead weight of its related parts and the leverage reduced force of the off-center spring 80. Although not shown in the drawings, provision is made to safety-pin the spring lever 74 to the control housing 45 during assembly and installation to avoid inadvertent firing of the fail-safe.

After firing, the torsion spring 79 shown in FIG. 7 acts to rotate the spring lever 74 and fork shaft 44 counterclockwise as viewed from the right in FIGS. 6 and 7, and clockwise as viewed from the right in FIG. 4. This moves the ball release 38 upward to position the ball release 38 preparatory to the reloading cycle. This torsion spring 79 accomplishes two things on the reload cycle: one, it assures that the ball release 38 will displace the locking balls 33 on the downward stroke of the ball carriage 37 as soon as the balls index with the fixed holding groove 36, and two, it repositions the spring lever 74 to be latched by the trigger 75 as soon as the solenoid 60 is re-energized without necessitating any electrical sequencing.

The function of the Belleville spring set 55 (FIG. 5) is to allow some over-travel of the ball carriage assembly on the downward return stroke following firing, even though the trigger mechanism is in latched position, or when the safety-pin lock is installed and still provide spring force sufficient to displace the locking balls 33 as they reach index position with the fixed groove 36. A control panel (not shown) is mounted within the control housing 45 and suitable exterior control attachments are provided for.

A shock-absorbing valve 96 is suspended within the stem nut to be actuated by the valve stem 23 as the stem 23 approaches the extreme UP travel position. The entire unit, including the spring cover 31a, is filled with an electrical insulating oil, and the oil trapped above the stem 23 must be displaced principally through the shock-absorbing valve 96. During a fail-safe firing, this oil thoroughfare is rapidly metered down to a full-closed condition after which normal leakage will allow completion of full travel. In this manner, the shock which the valve parts and the operator parts would normally be required to sustain is minimized. Provision is made in the bottom plate of the control housing 45 to connect to an accumulator system for compensating for oil displacement during operation and for effecting a pressure balancing between the interior of the unit and the exterior elements.

OPERATION

It may be helpful now to describe one complete cycle of operation.

In FIG. 2, the stem 23 is at its extreme DOWN position. Assume that in this position of the stem 23 the valve 100, which is at the lower end of the stem, as illustrated diagrammatically in FIG. 13, is in open position, and that the function of the fail-safe mechanism is, in the event of a power failure, to pull the stem 23 up to its extreme UP position to close the valve.

During normal operation, the motor driven worm shaft 86 drives worm 20, worm gear 21, drive sleeve 22 and nut 24 rotationally, in one direction or the other. The nut 24 is locked against vertical movement in either direction since the nut ring 25 is lodged between the upper and lower shoulders of the ball carriage 27 which is locked against vertical movement by the thrust sleeve 50. Thus, during normal operation, the rotation of the axially-fixed nut 24 moves the stem 23 up or down, according to the direction of rotation of the drive sleeve 22.

During normal operation, the fail-safe spring 30 is compressed, as in FIG. 2, and the locking balls 33 are locked in the stationary holding groove 36 by the ball release 38 which is in its upward position, as shown enlarged in FIG. 10. Also, during normal operation, the toggle-type triggering mechanism 62 is in the condition illustrated in FIG. 6 in which the trigger latch 75 prevents the fork shaft 44 from rotating, thereby preventing the ball reelase 38 from moving down despite the downward force exerted on it by the downward force component derived from the fail-safe spring 30. This downward force component is urging the fork shaft 44 clockwise, as viewed from the right in FIG. 6, and the trigger bracket 63 is being urged counterclockwise, but trigger bracket 63 is prevented from pivoting about its mounting pin 65 by the fact that its downward force component is being taken by three pins which are in a direct vertical line, namely, pins 69 and 70 and fixed mounting pin 66.

Assume now that at the moment when the valve stem 23 is in DOWN position shown in FIG. 2, the power fails. When this occurs, the force exerted by the spring-biased push bar 80 (FIG. 6) is able to move the pivot lock 64 clockwise about mounting pin 66, as viewed in FIGS. 6 and 7, thereby moving pin 70 out of the direct vertical line referred to above. As soon as pin 70 is moved out of its direct vertical alignment with pins 69 and 66, the toggle-type trigger mechanism collapses under the force being exerted thereon by the lever 74 and fork shaft 44, and the trigger mechanism takes up the position shown in FIG. 7. The fork lever 44 is now free to rotate (clockwise as viewed looking in from the right in FIG. 7) and it does so. This allows the ball release 38 (FIGS. 10 and 11) to move down, and this in turn allows the balls 33 to move radially inward under the inward force component being exerted on them by the upward force component of the ball carriage 27 and the contour of the holding groove 36. The balls 33 therefore move from the position shown in FIG. 10 to the position illustrated in FIG. 11, and the ball carriage 27 and thrust sleeve 50 are released for upward movement.

When the thrust sleeve 50 moves upward, the nut 24 and stem 23 are pulled up to the UP or fail-safe position illustrated in FIG. 3. This movement upward of the stem 23 is stopped by the valve closure element 101 abutting against the stop abutment 102, as shown in FIG. 13. Just before the stem 23 reaches the UP limit position, the upper end of stem 23 (FIGS. 2 and 3) abuts against button 97 of valve 96 to close valve 96 and prevent oil from the upper or dome portion of the valve operator from escaping into the lower portion, thereby providing a hydraulic shock absorbing action.

To reset the valve operator, when power is again available, the motor drive is driven to rotate nut 24 in a direction to move stem 23 upward. However, stem 23, as a result of the fail-safe action just described, is already at its extreme UP position and it cannot move farther up because of the stop abutment 102 which bars further movement of the closure element 101 in the closing direction. As a result, when nut 24 is rotated, it climbs rotatably down the stem 23 pulling down with it the ball carriage 27 and the thrust sleeve 50 and compressing the fail-safe spring 30.

Figure 5:
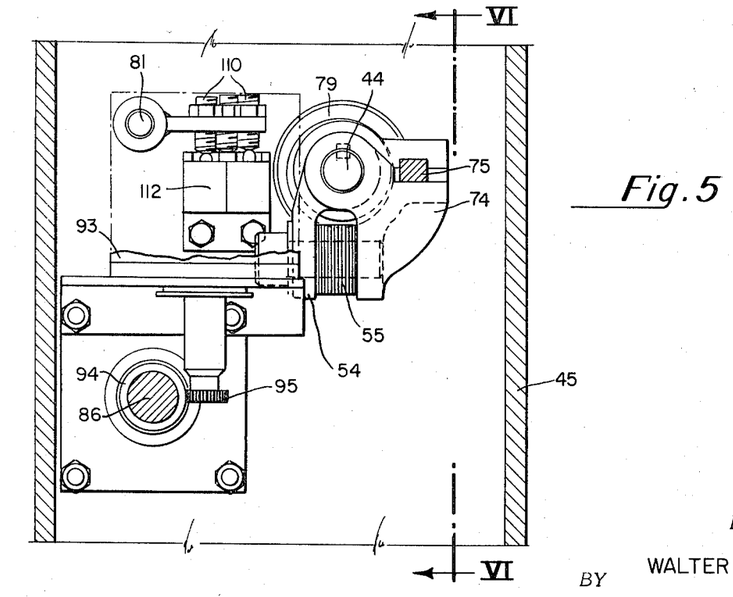
FIG. 5 is a view taken along the line V—V of FIG. 4 looking in the axial direction of the fork shaft, and showing the indicating switches.

As described above, when, at the time of power failure, the trigger mechanism fired and the ball carriage 27, nut 24 and stem 23 were pulled up to fail-safe position, the downward force component on the ball release 38 was removed, and with this downward force removed, torsion spring 79 (FIG. 7) now turns spring lever 74 and fork shaft 44 counterclockwise, as viewed looking in from the right in FIG. 7, and also as viewed in FIG. 5, but clockwise as viewed looking in from the right in FIG. 4. The solenoid 60 is now again in energized condition, and the plunger 72 has been pulled in, and the toggle-like trigger mechanism has again taken the position illustrated in FIG. 6. If, when this position is taken, the spring lever 74 has not yet been sufficiently rotated by torsion spring 79 to allow the trigger 75 to latch, the trigger 75 abuts momentarily against the side wall of the lever 74 and the spring-loaded push pin 78 is momentarily depressed, as shown in FIG. 8, until the lever 74 has rotated sufficiently to allow the trigger 75 to latch.

Rotation of fork shaft 44 by torsion spring 79, following power failure, described above, has the effect of moving the ball release 38 upward, and the ball release 38 takes up a position relative to the stationary holding groove 36 as illustrated in FIG. 12.

As the rotating nut 24 climbs downward on the stem 23, during the resetting operation now being described, the ball carriage 27 moves downward, as illustrated in FIG. 12. Just before the balls 33 become aligned with the holding groove 36, they encounter the upper end of the ball release 38 and drive the ball release 38 downward, to a position such as shown in FIG. 11. Shortly thereafter, as the downward movement continues, the balls 33 become aligned with the holding groove 36 and are forced therein by the inward force component created by the downward force of the balls on the inclined surface 48 of the ball release 38. The balls 33 are now in their locking position, and the toggle-like trigger mechanism 62 is in the latched position illustrated in FIG. 6.

The fact that the mechanism has been fully returned to its locked trigger position is indicated by indicating mechanism including cam rod 49, follower 83 and lever 52 which rotates shaft 81 to provide the necessary indications. These indications are effected by means of the adjustable switch actuators 110 which actuate one or more of the switches 112 (FIG. 5) according to the position of shaft 81, which in turn depends upon the position of follower 83 as controlled by the cam rod 49.

Previously herein reference was made to oil metering valve 96 which controls the metering of oil from the upper cavity of the spring cover 31a to the housing 31b. This valve 96 is supported at the lower end of a central tube 98 which has a port therein and is filled with oil. Tube 98 is resiliently supported by a spring 198 the upper end of which seats in the recess of a stop ring 197 as held by a split ring clip in a fixed position on the tube 98. The lower end of spring 198 rests upon and is supported by the upper end of nut 24. Thus, oil tube 98 is supported by the nut 24. The upper end of tube 98, which is of reduced diameter and is externally threaded, is received into the internally threaded abutment sleeve 99, the upper end of which abuts against the spring cover 31a. Thus, adjustment of the axial position of oil metering valve 96 may be made by rotating the abutment sleeve 99 relative to the tube 98 before placing the cover 31a, thereby to control the extent to which the oil metering valve 96 is closed when the stem 23 is pulled up by the fail-safe spring 30.

While the preferred embodiment of this invention has been described in some detail, it will be obvious to one skilled in the art that various modifications may be made without departing from the invention as hereinafter claimed.

What is claimed is:

1. In a valve operator for moving a threaded rotatable valve stem axially between two limit positions, one of which is the fail-safe position for the valve; a housing; an elongated rotatable nut having a portion internally threaded for engagement with said stem and externally keyed for sliding engagement with a power driven drive sleeve; a non-rotatable thrust sleeve; a ball carriage secured to said thrust sleeve; means connecting said thrust sleeve and ball carriage to said nut for axial movement together while allowing rotational movement of said nut independently of said thrust sleeve; fail-safe spring means connected between said thrust sleeve and a fixed part of said housing for spring loading said thrust sleeve, ball carriage and nut toward said fail-safe limit position; a plurality of radially directed axially counterbored holes in said ball carriage; a plurality of locking balls in each of said radial holes; an annular ball release surrounding said nut and having one end thereof beveled and projecting into the counterbores of said radial holes for maintaining said balls in such position that a substantial portion of one ball projects radially outwardly from each hole; an annular holding groove fixed in said housing for receiving the projecting portions of said balls when said thrust sleeve and ball carriage are so positioned axially that said radial holes are in alignment with said fixed annular holding groove, a wall of said groove being inclined to transmit a radially inward force component to said projecting balls in response to the axial force component of said spring-loaded thrust sleeve and ball carriage; trigger latch means; means coupling said trigger latch means to said ball release to oppose movement of said ball release in the withdrawal direction; and power energized means for controlling said trigger latch means.

2. Apparatus as claimed in claim 1 characterized in that said trigger latch control means includes a power energized solenoid having a plunger, linkage means linking said solenoid plunger to said trigger latch means, said solenoid when in energized condition being effective through said linkage means to maintain said trigger latch means in latching position, and spring-biased means urging said solenoid plunger toward de-energized position so that upon failure of power said plunger is moved to trigger withdrawal of said latch means from latching position, thereby to allow withdrawal of said ball release from said radial holes, thereby to release said locking balls for radially inward movement, thereby to release the energy stored in said fail-safe spring means to move said thrust sleeve, nut and stem axially to the fail-safe limit position.

3. Apparatus as claimed in claim 2 characterized in that said ball release is provided with an exterior groove; and further characterized in that said means coupling said trigger latch means to said ball release includes a fork shaft pivotally supported in said housing normal to the axis of said ball release, a fork fixed to said fork shaft having trunnion pins received by said groove of said ball release for moving said ball release axially; and a lever arm fixed to said fork shaft for angular movement therewith, said latch means being interposed in the path of movement of said fork-shaft lever arm, whereby angular movement of said lever arm, fork shaft, and fork in a direction to withdraw said ball release is prevented when said latch means is in latching position.

4. Apparatus as claimed in claim 3 further characterized in that said linkage means which connects the plunger of said solenoid to said latch means includes a toggle lever pivotally fixed to said plunger; a pivot lock pivotally mounted on first fixed pivot means and connected by first movable pivot means to said toggle lever; and a trigger bracket pivotally mounted on second fixed pivot means and connected by second movable pivot means to said toggle lever, the linkage means arrangement being such that when said latch means is in latching position the force component on said latch is transferred through said trigger bracket and is opposed collectively by said second movable pivot means, said first movable pivot means and said first fixed pivot means, said three pivot means being disposed in a direct line relative to said force component when said solenoid is in energized condition, and further characterized in that spring-biased means is pivotally connected to said pivot lock for moving said first fixed pivot means out of said direct line when said solenoid is de-energized, thereby to reduce substantially the force opposing movement of said trigger bracket, thereby to allow angular movement of said trigger bracket and withdrawal of said latch means from latching position.

5. Apparatus as claimed in claim 4 further characterized in that said fixed annular holding groove has an isosceles trapezoidal cross section.

6. Apparatus as claimed in claim 5 further characterized in that retaining means are fixed to said ball carriage for retaining said balls in said carriage when the ball release is withdrawn.

7. In a valve operator; a threaded valve stem having a valve closure element attached to one end thereof; power drive means for moving said stem axially to move said closure element from open to closed positions, and vice-versa, said power drive means including a nut threaded to said stem and a drive sleeve splined to said nut for driving said nut rotationally while allowing relative movement in the axial direction between said nut and said drive sleeve; a housing; a thrust sleeve, means securing said thrust sleeve to said nut; a compression spring between said thrust sleeve and said housing urging said nut axially toward a fail-safe position; and electrically energized locking means, said locking means including an annular ball carriage fixed to said thrust sleeve, a plurality of radially directed counterbored slots in said ball carriage, a plurality of locking balls in each slot, a fixed annular member having on its inner surface a circumferential holding recess for receiving the projecting part of one ball in each of said slots when said holding recess and slots are axially aligned, a ball release sleeve adapted to enter the counterbore of said slots to retain said balls in said slots in such position that a portion of one ball of each slot projects into said holding recess; and power controlled latch means preventing withdrawal of said ball release sleeve.

8. Apparatus as claimed in claim 7 characterized in that said latch means includes a fork engaging said ball release sleeve and pivotal about a fork shaft, a lever fixed to said fork shaft, and a trigger latch adapted to extend into the path of said lever to prevent angular movement thereof.

9. Apparatus as claimed in claim 8 further characterized in that said latch is pivotally mounted on a trigger bracket, said trigger bracket being pivotal about a first fixed pivot pin, a toggle lever is pivotally connected by a first movable pivot pin to said trigger bracket, a pivot lock is supported on a second fixed pivot pin, said second fixed pivot being pivotally secured by a second movable pivot pin to said toggle lever, solenoid means having a plunger connected to said toggle lever is provided for holding said toggle lever in such position that said first and second movable pivot pins are in direct line with said second fixed pivot pin, thereby to prevent rotational movement of said trigger bracket about said first fixed pivot pin, and spring-loading means is connected to said pivot lock for moving said second movable pivot pin out of said direct line when said solenoid is deenergized, thereby to allow pivotal movement of said trigger bracket about said first fixed pivot pin, thereby to withdraw said latch from latching position.

10. In a valve operator for moving a valve stem axially from one limit position to another, in which said stem is externally threaded, and in which an internally-threaded external-splined nut is driven by an internally-splined drive sleeve to rotate said nut to move said stem axially while allowing sliding axial relative movement between said nut and drive sleeve; spring-loaded thrust means secured to one end of said nut urging said nut and threaded stem axially toward a fail-safe limit position; a locking ball carriage secured to said thrust sleeve and having a plurality of radially-directed holes each having therein at least one spherically-surfaced locking unit; a fixed annular holding member for receiving projected portions of said spherically surfaced units; ball release means; latching means; means connecting said ball release means to said latching means; and solenoid means controlling said connecting means to prevent withdrawal of said ball release means from said holes so long as said solenoid is energized.

11. Apparatus as claimed in claim 10 characterized in that said connecting means includes a shaft mounted pivotal fork connected to said ball release means, and in that said latching means is disposed to prevent rotation of said fork shaft in the withdrawal direction.

12. Apparatus as claimed in claim 11 further characterized in that said solenoid means includes spring-loaded means effective upon failure of power for moving the plunger of the solenoid in a direction to unlatch said latching means.

13. In a valve operator; a valve stem; a nut on said stem; power drive means for rotating said nut to move said stem axially relative to said nut; a housing; thrust means within said housing connected to said nut; means for storing energy in said thrust means to urge said nut and stem axially toward a fail-safe position; a ball detent carriage secured to said thrust means; ball detents in said carriage; recess means in said housing for receiving ball detents; releasable retaining means for retaining said ball detents in said recess means for preventing release of the stored energy in said thrust means while allowing power driven axial movement of said stem; and trigger latch means adapted to be triggered by failure of power for releasing said retaining means to allow the stored energy in said thrust means to discharge the ball detents from said recess means and to move said stem to fail-safe position.

14. Apparatus according to claim 13 characterized in that said ball detent carriage is provided with a plurality of radially directed slots each of which is provided with at least two ball detents.

15. Apparatus according to claim 14 characterized in that said recess means is provided with a camming shoulder tending to cam said ball detents out of said recess.

16. Apparatus according to claim 15 characterized in that said slots in said ball detent carriage are counter-bored, and in that said releasable retaining means, in non-released position, projects into said counterbores to retain said ball detents in said recess.

17. Fail-safe apparatus comprising: a housing; a work member; thrust means within said housing connected to said work member; means for storing energy in said thrust means to urge said work member toward a fail-safe position; a ball detent carriage secured to said thrust means; ball detents in said carriage; recess means in said housing for receiving ball detents; releasable retaining means for retaining said ball detents in said recess means for preventing release of the stored energy in said thrust means while allowing power driven movement of said work member; and trigger latch means adapted to be triggered by failure of power for releasing said retaining means to allow the stored energy in said thrust means to discharge the ball detents from said recess means and to move said work member to fail-safe position.

18. Apparatus according to claim 17 characterized in that said ball detent carriage is provided with a plurality of radially directed slots each of which is provided with at least two ball detents.

19. Apparatus according to claim 18 characterized in that said recess means is provided with a camming shoulder tend to cam said ball detents out of said recess.

20. Apparatus according to claim 19 characterized in that said slots in said ball detent carriage are counter-bored, and in that said releasable retaining means, in non-released position, projects into said counterbore to retain said ball detents in said recess.

21. Apparatus according to claim 20 characterized in that said trigger latch means includes power energized control means for said latch means and in that said control means includes a solenoid having a plunger, linkage means linking said solenoid plunger to said trigger latch means, said solenoid when in energized condition being effective through said linkage means to maintain said trigger latch means in latching position, and spring-biased means urging said solenoid plunger toward de-energized position so that upon failure of power said plunger is moved to trigger withdrawal of said latch means from latching position.

22. Apparatus according to claim 20 characterized in that said trigger latch means includes power energized control means for said latch means and in that said control means includes a solenoid having a plunger, linkage means linking said solenoid plunger to said trigger latch means, said solenoid when in energized condition being effective through said linkage means to maintain said trigger latch means in latching position, and spring-biased means urging said solenoid plunger toward de-energized position so that upon failure of power said plunger is moved to trigger withdrawal of said latch means from latching position.

References Cited

UNITED STATES PATENTS

| | | | |
|---|---|---|---|
| 3,309,942 | 3/1967 | Caldwell | 74—625 |
| 3,324,741 | 6/1967 | Anderson | 74—625 |

FRED C. MATTERN, JR., Primary Examiner

F. D. SHOEMAKER, Assistant Examiner

U.S. Cl. X.R.

74—2, 424.8, 625; 251—67, 69, 71